United States Patent [19]

Cloutier et al.

[11] 4,165,565
[45] Aug. 28, 1979

[54] FOOD METER

[76] Inventors: Michel Cloutier; Yves Doucet, both of Nicolet; Gilles Jutras, Baieville; Pierre Gagne, Nicolet, all of Canada

[21] Appl. No.: 864,041

[22] Filed: Dec. 23, 1977

[51] Int. Cl.² .............................. G01F 19/00; G01F 11/28
[52] U.S. Cl. ................................................ 33/174 T; 73/426
[58] Field of Search ............... 73/426, 429; 33/174 T, 33/168 R, 1 F; 220/22; 211/49 R, 41 R, 50, 49 S, 60 R, 60 M

[56] References Cited

U.S. PATENT DOCUMENTS

| 2,279,897 | 4/1942 | Ammon | 211/49 R |
|---|---|---|---|
| 2,389,530 | 11/1945 | Miner | 73/426 |
| 2,613,537 | 10/1952 | Diaddario | 73/426 |
| 2,645,127 | 7/1953 | Parks | 73/429 |
| 2,799,086 | 7/1957 | Tupper | 73/426 |
| 3,079,028 | 2/1963 | Rosner | 220/22 |
| 3,874,085 | 4/1975 | Atkins | 73/426 |

FOREIGN PATENT DOCUMENTS 89812 8/1957 Norway .............................. 211/50

Primary Examiner—S. Clement Swisher
Assistant Examiner—Denis E. Corr

[57] ABSTRACT

A food meter comprising a base and four upstanding walls defining three spaces for the metering of spaghetti-like food. The spaces are generally in the form of troughs and are of graduated width for the selective metering of the food. A hole is made in the base for hanging the instrument if so desired.

1 Claim, 4 Drawing Figures

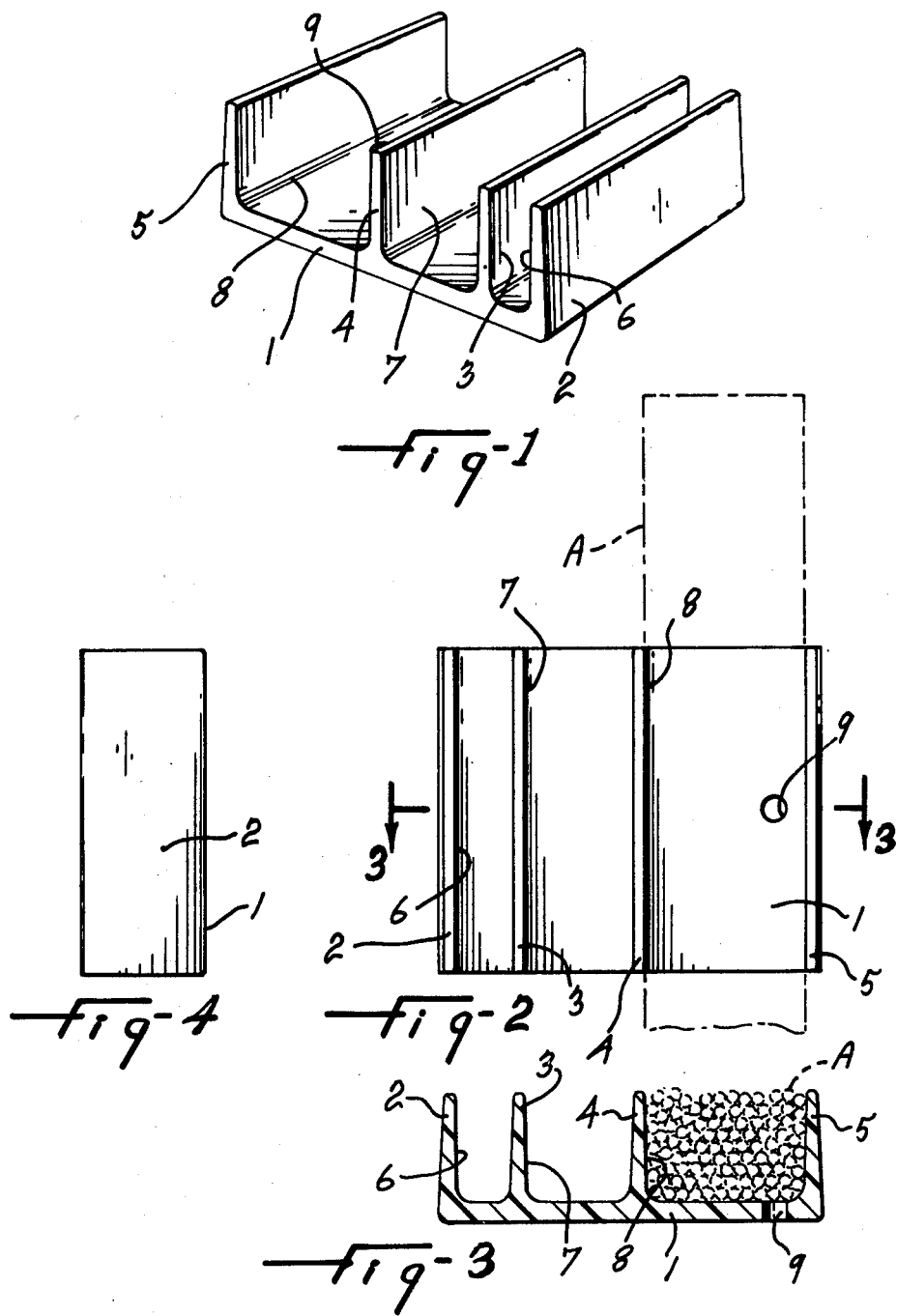

FOOD METER

This invention relates to a food meter particularly for measuring the proper amount of spaghetti-like food prior to cooking.

There is a need to provide a simple, easy to use, inexpensive to manufacture and an easily cleanable and storable kitchen instrument for the metering or measurement of spaghetti or similar fibrous or filamentous food. Such food has swelling properties so that when cooked it occupies more volume than when uncooked. Therefore it is difficult to measure a precise amount even when the correct proportion of swelling is known.

Accordingly it is an object of the present invention to provide a food meter which is simple, easy to use, non-costly to produce and easily cleanable and storable.

It is a further object of the present invention to provide a food meter wherein it is insured that the proper amount of spaghetti will be metered.

These and other objects of the present invention are accomplished in accordance with a preferred embodiment of the present invention by the provision of a body formed by a base with upstanding parallel walls. The walls are progressively spaced apart to define compartments of different sizes. Preferably a hole is provided in case the instrument is to be hung.

The above will be better understood by reference to the following detailed description and also to the preferred embodiment itself, illustrated by way of the accompanying drawings in which:

FIG. 1 is a perspective view of the meter;

FIG. 2 is a top view showing the spaghetti-like food in dashed outline;

FIG. 3 is a corss-sectional view taken along line 3—3 of FIG. 2; and

FIG. 4 is a side view.

The instrument of the invention is preferably molded as a one piece body from a synthetic resin and includes a base 1 and integral, upstanding, spaced, substantially parallel walls 2, 3, 4 and 5. The walls and the base are generally rectangular in configuration having the appearance of a three-dimensional comb. Walls 2, 3, 4 and 5 are progressively spaced apart two-by-two to define compartments 6, 7 and 8 of progressive width which are used for receiving various amounts of food. As is readily apparent, the three compartments can contain three different volumes of uncooked spaghetti A, noodles or like food when each compartment, as the case may be, is filled to the same level flush with the top edges of the walls.

The two wider compartments preferably have widths which are two and three times, respectively the width of the narrowest compartment.

Thus the instrument can measure servings for one, two or three persons. The three compartments may also be used for persons of varying appetites, it is to be noted.

A hole 9 is provided in case the instrument is to be hung, as for example on a kitchen wall.

What we claim is:

1. A food meter comprising a base and at least four upstanding, spaced, substantially parallel walls of substantially equal height defining three compartments, said base and said walls being generally rectangular in the horizontal and vertical planes respectively, said compartments being fully open at the top and at both ends, said walls having top edges lying in a plane substantially parallel to the plane of said base, the surfaces of each compartment as defined by said base and two associated walls being smooth and free of any protrusion including the edges of said base and walls, said walls being progressively spaced apart two-by-two and defining compartments of progressive widths, the two wider compartments being two and three times, respectively, the width of the narrowest compartment, whereby uncooked rigid spaghetti-like pasta or similar rod-like rigid food may be inserted in anyone compartment longitudinally of the latter with the end portions of the rod-like food protruding from the open ends of the compartment, the rod-like food being in contact with the entire surfaces of said compartment, the latter measuring a precise quantity of such rod-like food when the latter fills the compartment and is flush with the top edges of the two walls of anyone compartment.

* * * * *